March 1, 1966  J. F. ALIX  3,237,914
CONTROL VALVE
Filed Sept. 28, 1962
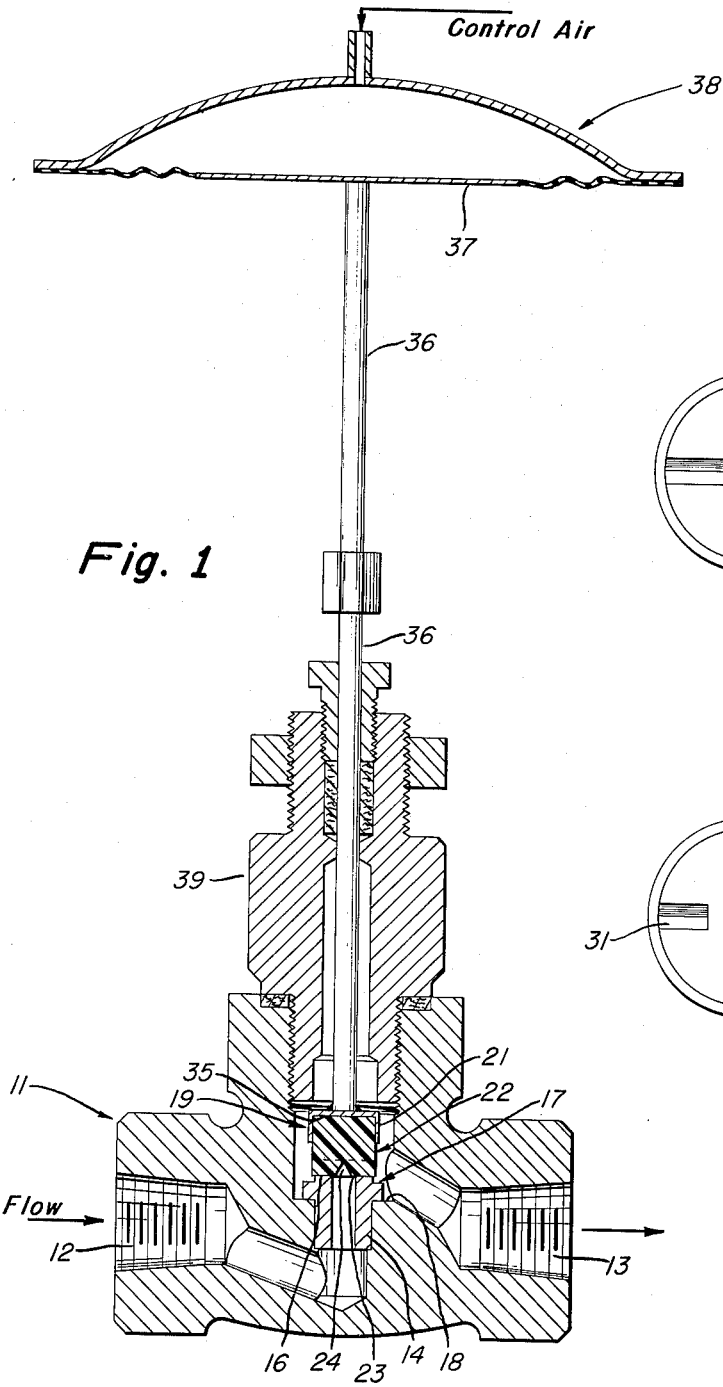
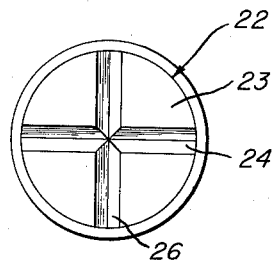
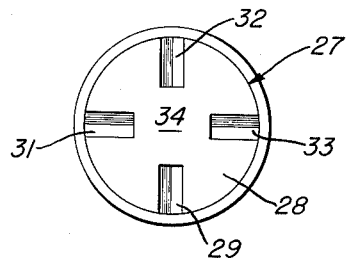
INVENTOR.
Joe F. Alix

3,237,914
CONTROL VALVE
Joe F. Alix, Texas City, Tex., assignor to Standard Oil Company, Chicago, Ill., a corporation of Indiana
Filed Sept. 28, 1962, Ser. No. 226,845
6 Claims. (Cl. 251—61)

This invention relates to control valves and particularly to control valves which are used to control flow of fluids containing abrasive materials.

There is a serious problem in industry where valves are used to control flow of fluids containing abrasive materials because these abrasive materials erode valve parts. Erosion of a valve gate and a valve seat result in leakage even when the valve is intended to be fully closed, and furthermore erosion makes it impossible to properly meter liquid flow rate in the most straightforward manner which is by positioning the valve stem to a predeterminded gate opening.

The problem of erosion is extremely serious where small flows are involved because small variations in flow rate caused by erosion involve large percentage changes. Because of the close-metal-to-metal clearances involved where conventional valves are used to control small flows, it is necessary to construct valve parts from expensive materials such as specifically hardened steels or alloys, for example Hastelloy.

An object of this invention is a valve for the flow-control of fluids containing abrasive materials. Another object of this invention is a valve for control of flow of fluids containing abrasive materials where the flow rates involved are small. A further object of this invention is a valve for the flow-control of fluids containing abrasive materials which does not need expensive materials to make the valve gate and the valve seat. A still further object of this invention is a valve wherein replacement of a gate is simple and inexpensive. Other objects of the invention will be apparent from the detailed description thereof.

FIGURE 1 shows, in section, an embodiment of the invention having a horizontal annular seat and a horizontal gate.

FIGURE 2 illustrates one form of the gate surface which contacts the valve seat of FIGURE 1.

FIGURE 3 illustrates another form of the gate surface suitable for use in the embodiment of FIGURE 1.

Broadly the valve of the invention has a valve body having a seat positioned around the fluid passage within the body, which seat is to be contacted by a resilient flow-control member. The resilient, flow-control member is provided with at least one channel, which is capable of being changed in shape to permit variable fluid flow ranging from zero to a predetermined maximum. Also a means is provided for moving the flow-control member against the seat to change the shape of the channel in the flow-control member and thereby to control flow of fluid through the valve body over the aforementioned range.

Referring now to the drawings for purposes of illustration, the embodiment of FIGURE 1 has valve body 11 which contains inlet fluid passage 12 and outlet fluid passage 13. Valve body 11 may be constructed of materials normally used, such as steel, brass, ceramics, glass, Hastelloy and Duriron. To provide a basic for control, valve body 11 is provided with a tubular insert 14 which is positioned around the fluid passageway connecting inlet 12 to outlet 13 within said valve body 11. Insert 14 is positioned with its longitudinal axis perpendicular to the axis of valve body 11 as determined by inlet 12 and outlet 13. The upper end 16 of tubular insert 14 functions as a seat to be contacted by the valve gate. It is to be understood that tubular insert 14 may serve as a base for a separate detachable seat when it is desirable to construct the insert and the seat from different materials. Insert 14 is maintained in position by means of shoulder 17 which rests on shoulder 18. Seat 16 is spaced from the walls which form the internal fluid passageway in order to provide a flat annular surface. Tubular insert 14 may be constructed of the material used for valve body 11 or it may be constructed from other material especially suitable for this particular use.

Rate of fluid flow is controlled by valve gate 19 which in the embodiment of FIGURE 1 consists of a cup 21 and a resilient, flow-control member 22.

Resilient, flow-control member 22 permits variable fluid flow ranging from zero to a predetermined maximum for the particular valve. Resilient member 22 is provided with at least one channel which is capable of being changed in shape; this capacity for change in shape permits control of variation in fluid flow. In the embodiment shown in FIGURE 1 face 23 of resilient member 22 contacts seat 16 when flow is being controlled; face 23 is as shown in FIGURE 2.

In the embodiment of FIGURE 1, resilient member 22 is provided with two channels 24 and 26. These channels are inverted V-shape, cross at right angles, and extend completely across face 23. The base of the V formed by the cross section of channels 24 and 26 respectively lies on face 23. It is to be understood that the channels in the resilient member can be of shapes other than the V-shape illustrated. Furthermore, the channels need not extend completely across the face of the resilient member.

FIGURE 3 is another embodiment of a resilient, flow-control member which is suitable for use in the valve of FIGURE 1. FIGURE 3 consists of resilient member 27 having face 28. Channels 29, 31, 32, and 33 of inverted V-shape, are positioned at the periphery of face 28, and extend inwardly from the periphery a distance sufficient to permit flow of fluid over valve seat 16 by way of the channels and on to outlet 13. In FIGURE 3 resilient member 27 has center area 34 which is even with face 28, it is to be understood that the center area 34 may be recessed.

Control member 22 must be resilient, that is, it must be elastic and capable of recovering its size and shape after deformation. It can be made of elastomeric materials, for example, rubbers, synthetic or natural. When corrosive fluids are being controlled the resilient member can be made of a special rubber such as neoprene rubber or Thiokol rubber. Furthermore, foamed materials, such as polyester resin foams, or polyurethane foams or even foam rubber may be employed for construction of the resilient, flow-control member.

In FIGURE 1 cup 21 is square shouldered and flat bottomed to provide for uniform distribution of force across upper surface 35 of resilient member 22. It is to be understood that force need only be applied across that part of the channels which are above annular seat 16. Cup 21 may be replaced by other embodiments which serve the purpose of transmitting force to the channels. For example, cup 21 could be replaced by a rigid spider embedded in resilient member 22.

Means are provided for moving gate 19 toward and away from seat 16 to change the shape of the channels in resilient member 22 and thereby to control flow of fluid through valve body 11. In the embodiment of FIGURE 1 that means is valve stem 36 which is connected to the flat bottom of cup 21 and which extends outside valve body 11. Valve stem 36 has its longitudinal axis coinciding with those of disc 22 and insert 14. Valve stem 36 is joined at its outer end to diaphragm 37 which is part of a fluid actuated diaphragm unit 38. Diaphragm unit 38 moves valve stem 36 toward or away from annular seat 16 whereby the rate of fluid flow through valve body 11 is controlled.

In the embodiment of FIGURE 1 stuffing box assembly 39 positions valve stem 36 over annular seat 16 and seals valve body 11 and valve stem 36. It is to be understood that stuffing box assembly 39 is entirely conventional and may be constructed as required for the particular valve.

The valve described in FIGURES 1 and 2 is employed in a butane isomerization unit wherein a liquid butane stream saturated with aluminum chloride is controlled. In the operation of the butane isomerization unit, there is some flashing in the chamber containing valve gate 19 and valve seat 16 whereby some solid aluminum chloride is deposited on seat 16 and face 23. In the past when valve gates have been constructed wholly of metals, aluminum chloride deposits have prevented seating by corroding and eroding the seat and the valve gate, making frequent replacement of these parts necessary. On the other hand, when the valve gate is constructed of neoprene rubber according to FIGURE 2, flexing and resiliency of the neoprene permit closing in spite of the irregularity of the seat caused by aluminum chloride deposits, and permits precise control of flow because the V-shaped channel is not affected by these deposits. An unexpected advantage from the use of a resilient gate was observed. Due to the flexing action of the resilient member the solid deposits of aluminum chloride on seat 16 and the face 23 of resilient member 22 were broken up and flushed out of the valve body by the flowing butane stream. This removal of solid deposits as they form, reduced both erosion and corrosion of seat 16.

In the operation described above, the butane stream flowing under pressure of 250 p.s.i. was controlled to flow at a rate from zero to a maximum of about two liters per hour. The liquid butane stream was saturated with aluminum chloride at a temperature of about 140° F. and flashed to atmospheric pressure after leaving the valve.

Thus, having described the invention what is claimed is:

1. A valve comprising: a valve body provided with an annular seat encircling a fluid passageway within said body, said seat to be contacted by a flow-control member; a resilient flow-control member provided with at least one channel, said channel being on the side of said flow-control member adjacent to said seat and being positioned on said side and of sufficient length for fluid to flow over said seat by way of said channel; and a mechanical means for moving said flow-control member toward and away from said seat and for applying a force on said flow-control member toward said seat, said channel being deformed and changed in size from a maximum to zero depending on the force applied to said flow-control member by said means in pressing said member to said seat, said means being constructed and arranged to effect movement of said flow-control member bodily from said seat to increase the flow rate through said passageway relative to the maximum flow of fluid through said channel.

2. The valve of claim 1 wherein said channel extends across said flow-control member.

3. The valve of claim 1 wherein said flow-control member is made of rubber.

4. The valve of claim 3 wherein said flow-control member is made from neoprene rubber.

5. A valve comprising: a valve body, provided with an annular seat encircling a fluid passageway; a resilient flow-control disc provided with two channels on the face of said disc adjacent to said annular seat, said channels crossing at right angles, having an inverted V-shape and extending completely across said face; a rigid disc having one side thereof joined to the side of said flow-control disc opposite said face; a valve stem having one end joined to the other side of said rigid disc and extending outside said valve body; a fluid actuated diaphragm joined to the other end of said valve stem and moving said valve stem and said flow-control disc toward and away from said annular seat, said channels being deformed and reduced in size from a maximum to zero depending on the force applied to the rigid disc by the diaphragm and stem in pressing the flow-control disc to its seat, said flow-control disc being bodily movable from said seat to increase the flow-rate through said passageway relative to the maximum flow through said channels.

6. A valve comprising: a valve body, provided with an annular seat encircling a fluid passageway; a resilient flow-control disc provided with a plurality of channels on the face of said flow-control disc adjacent to said seat, said channels having an inverted V-shape, said channels being positioned at the periphery of said flow-control disc and extending inwardly a distance sufficient for fluid to flow over said seat by way of said channels; a rigid disc having one side thereof joined to the side of said flow-control disc opposite said face; a valve stem having one end joined to the other side of said rigid disc and extending outside said valve body; a fluid actuated diaphragm joined to the other end of said valve stem and moving said valve stem and said flow-control disc toward and away from said seat, said channels being deformed and reduced in size from a maximum to zero depending on the force applied to the rigid disc by the diaphragm and stem in pressing the flow-control disc to its seat, said flow-control disc being bodily movable from said seat to increase the flow rate through said passageway relative to the maximum flow through said channels.

References Cited by the Examiner

UNITED STATES PATENTS

| | | | |
|---|---|---|---|
| 1,022,327 | 4/1912 | Nelson | 251—61 |
| 2,508,793 | 5/1950 | Miller | 138—43 |
| 2,838,072 | 6/1958 | Stumm | 138—43 X |
| 2,853,264 | 9/1958 | Lodge | 138—45 X |
| 2,914,258 | 11/1959 | Ruetsch | 251—368 X |
| 2,992,808 | 7/1961 | Burritt | 138—46 X |

ISADOR WEIL, *Primary Examiner.*

MARTIN P. SCHWADRON, *Examiner.*